United States Patent [19]

Ou-Yang

[11] Patent Number: 5,537,950
[45] Date of Patent: * Jul. 23, 1996

[54] THERMALLY RESPONSIVE INDICATOR WITH ORGANIC RETAINING MEANS

[75] Inventor: David T. Ou-Yang, Woodbury, Minn.

[73] Assignee: Volk Enterprises, Inc.,, Turlock, Calif.

[ * ] Notice: The portion of the term of this patent subsequent to Jun. 28, 2011, has been disclaimed.

[21] Appl. No.: 236,652

[22] Filed: Apr. 29, 1994

Related U.S. Application Data

[63] Continuation of Ser. No. 117,230, Sep. 3, 1993, abandoned, and a continuation-in-part of Ser. No. 20,100, Feb. 19, 1993, Pat. No. 5,323,730.

[51] Int. Cl.⁶ .............. G01K 11/06; G01K 1/02
[52] U.S. Cl. .......... 116/218; 116/217; 116/281; 116/283; 252/408.1; 99/342
[58] Field of Search ................. 116/217, 218, 116/281, 283, 101, 106, 216; 374/160, 155; 252/408.1; 99/342

[56] References Cited

U.S. PATENT DOCUMENTS

| 945,978 | 1/1910 | Nielsen et al. |
|---|---|---|
| 1,509,110 | 9/1924 | Potter . |
| 3,140,611 | 7/1964 | Kliewer . |
| 3,548,780 | 12/1970 | Kliewer .................. 116/218 |
| 3,559,615 | 2/1971 | Kliewer .................. 116/218 |
| 3,682,130 | 8/1972 | Jeffers . |
| 3,693,579 | 9/1972 | Kliewer .................. 116/218 |
| 3,713,416 | 1/1973 | Volk . |
| 3,811,402 | 5/1974 | Keeley et al. .......... 116/218 |
| 3,965,849 | 6/1976 | Gee ...................... 116/218 |
| 4,083,364 | 4/1978 | Kelly et al. . |
| 4,170,956 | 10/1979 | Wear .................... 116/218 |
| 4,289,088 | 9/1981 | Scibelli ................. 116/218 |
| 4,356,790 | 11/1982 | Gee ..................... 116/218 |
| 4,421,053 | 12/1983 | Volk .................... 116/218 |
| 4,748,931 | 6/1988 | Volk .................... 116/218 |
| 4,818,119 | 4/1989 | Busch et al. ........... 116/218 |
| 4,826,762 | 5/1989 | Klibanov et al. ....... 116/217 |
| 4,932,429 | 6/1990 | Watanabe et al. ...... 116/218 |
| 4,947,786 | 8/1990 | Maynard et al. ....... 116/218 |
| 5,323,730 | 6/1994 | Ou-Yang ............... 116/218 |

FOREIGN PATENT DOCUMENTS

| 0528625A1 | 2/1993 | European Pat. Off. . |
|---|---|---|
| 3229020 | 2/1984 | Germany . |

Primary Examiner—Diego F. F. Gutierrez
Attorney, Agent, or Firm—Julian Caplan; Flehr, Hohbach, Test, Albritton & Herbert

[57] ABSTRACT

An indicator is disclosed for providing an indication that a food item has attained a predetermined temperature. The indicator comprises a barrel having a cavity wherein a plunger is disposed in a retracted position using a retaining material. The retaining material melts when a predetermined temperature is reached releasing the plunger towards an extended position. The retaining material comprises (1) a fatty ketone and (2) at least one other organic compound selected from the group consisting of fatty amides and fatty anilides.

13 Claims, 3 Drawing Sheets

THERMALLY RESPONSIVE INDICATOR WITH ORGANIC RETAINING MEANS

This is a continuation of application Ser. No. 08/117,230 filed Sep. 3, 1993, now abandoned, and a continuation-in-part of application Ser. No. 08/020,100 filed Feb. 19, 1993, now U.S. Pat. No. 5,323,730.

BACKGROUND OF THE INVENTION

1. Technical Field

This invention relates to thermally responsive indicating devices. More particularly, it relates to devices that provide a signal upon the attainment of specified temperatures.

2. Discussion of the Art

Thermally responsive indicators are useful in a variety of fields for providing a visual indication of the attainment of a specified temperature. For example, U.S. Pat. No. 4,083,364 discloses a thermal indicator mounted through the skull of an animal to detect the presence of an elevated body temperature. German Patent No. 3,229,020 discloses a thermally responsive indicator that is designed to be mounted on an electrical conductor. The device provides a visual indication of the attainment of an elevated temperature in the conductor. U.S. Pat. No. 4,818,119 discloses a railroad wheel bearing bolt with an axially extending bore into which a heat sensor and indicator are inserted. The indicator is exposed when a specified temperature is attained. U.S. Pat. No. 4,289,088 discloses a sterility indicating device for use in a steam autoclave.

Thermally responsive indicating devices are especially useful in preparing food products, particularly meat and fowl. Such devices can be used to indicate the elevated temperature of the interior of the food product, rather than the temperature of the exterior thereof. By indicating the attainment of a specified internal temperature of the food product, the device can signal when the food product is organoleptically acceptable. These devices must be sufficiently accurate to prevent undercooking or overcooking, which not only may significantly diminish the palatability of the food, but may also even render the food dangerous to eat, as in the case of undercooked pork.

Several such devices for use in cooking food are known. Examples of early indicating devices are described in U.S. Pat. Nos. 945,978 and 1,509,110, each of which allows a plunger biased by a spring to be released into an extended position upon attaining a specified temperature. Retaining means, which is typically a fusible material, holds the plunger in a retracted position until the fusible material yields, at which time a spring urges the plunger into an extended position. When in the extended position, the plunger provides a visual indication to the user that the food is "done." To further enhance the visibility of the plunger when it is in the extended position, a cap may be attached to the end thereof.

The material of the retaining means has typically comprised metal alloys, as in U.S. Pat. Nos. 3,140,611, 3,682,130, 3,693,579 and 3,713,416. Indicators that use such alloys include the "Vue-Temp" brand and "Pop-Rite" brand pop-up timers, manufactured by the Volk Development Company of Turlock, Calif. 95381. While devices employing such retaining materials have proven useful, they have certain drawbacks. For example, such alloys are typically prepared from toxic metallic substances such as bismuth, lead, cadmium, tin, and other materials. Furthermore, metal alloys have high density. Thus, a given volume of retaining material requires a significant amount of alloy, thereby adding to the expense of the device.

Organic compounds, such as waxes, have been suggested as replacements for metal alloys. However, waxes typically yield over a relatively wide temperature range, and, if composed of a mixture of different materials, can have multiple melting temperatures, thereby resulting in a premature or a delayed signal. This, as mentioned above, is undesirable because the food item could either be undercooked or overcooked, respectively.

A device that attempts to overcome the problems exhibited by alloy and wax retaining materials is described in U.S. Pat. No. 4,170,956. This patent discloses a nitrogen-containing organic retaining material. Devices using these nitrogen-containing materials have been sold in the United States under the name "Dun-Rite" brand pop-up timers by Minnesota Mining and Manufacturing Company of St. Paul, Minn. The nitrogen-based materials used in these devices do not exhibit the toxicity problems of their alloy predecessors and exhibit better release characteristics than waxes. However, the nitrogen-based materials disclosed in this patent also have certain drawbacks.

For example, the nitrogen-based materials of this patent are very pure when they are prepared. Melting temperature (and therefore yield temperature) tends to increase with increased purity, and the materials of this patent melt at approximately 84.9° C. when they are tested in their purest state. A turkey is considered "done" when the interior temperature thereof reaches approximately 82.2° C. Consequently, the nitrogen-based retaining material must be mixed with a foreign substance to reduce its purity. The use of foreign substances adds unnecessary expense. Salts, which are added to the nitrogen-based material to clean it, tend to solidify to form gel globules in the material, thereby requiring that the material be strained. The straining process often must be conducted repeatedly, thereby increasing the time and cost of production. The yield is reduced, and, consequently, a greater amount of material must be manufactured and processed to obtain a given amount of retaining material.

SUMMARY OF THE INVENTION

This invention provides a thermal indicator capable of indicating that an article of food is heated to a specified temperature. The indicator comprises a barrel having an opening communicating with a chamber within the barrel, a plunger disposed in the chamber and adapted for sliding travel therein between a retracted position and an extended position, means for resiliently biasing the plunger away from the retracted position and toward the extended position, and retaining means for releasably retaining the plunger in the retracted position. The barrel is adapted for insertion into the article of food to be heated.

The retaining means comprises a material formed from a mixture comprising at least two organic compounds selected from the group consisting of fatty acids, fatty ketones, fatty amides, and fatty anilides, provided that at least one of said two organic compounds is selected from the group consisting of fatty ketones and fatty acids and at least one other of said two organic compounds is selected from the group consisting of fatty amides and fatty anilides. The melting point of the mixture is preferably lower than the melting point of any individual component.

The organic compounds must be at least 80% pure, more preferably at least 95% pure. These organic compounds preferably have a single melting point. It is also preferred that the melting temperature of the mixture range from about 56° C. to about 95° C. and melt within 15° C. of the melting point. The aforementioned organic compounds are inexpensive and result in a substantial cost savings per unit. More importantly, the organic compound retaining materials are not toxic and are therefore safer for use in food then retaining materials comprising metal alloys.

DETAILED DESCRIPTION OF THE INVENTION

Figure 1:
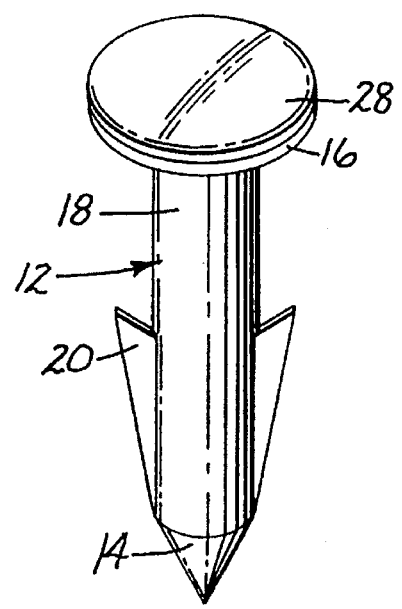
FIG. 1 is an inclined side elevation view of the indicator of the present invention.
Figure 2:
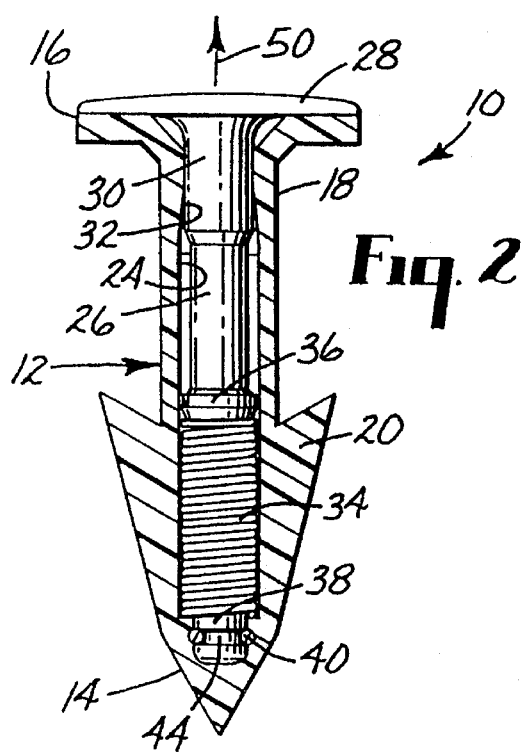
FIG. 2 is a central longitudinal sectional view of the indicator of FIG. 1 in a retracted position, viewed in the plane 2—2 of FIG. 1.

Referring specifically to FIGS. 1 and 2, indicator 10 is shown including barrel 12. Barrel 12 is a monolithic molded body made of a material capable of withstanding the elevated temperatures encountered in a cooking environment. Nylon is the preferred material, although other materials could be adapted for use in the cooking environment as well. Barrel 12 includes lower barrel end 14 adapted for insertion into a food item and may be provided with one or more barbs 20 radially disposed near lower barrel end 14 for retaining the indicator in the food once inserted. Barrel 12 also includes annular flange 16 located adjacent upper barrel end 18. Flange 16 may be of varying radial dimensions so as to contact the surface of the food item when indicator 10 is inserted therein to prevent further insertion.

Figure 3:
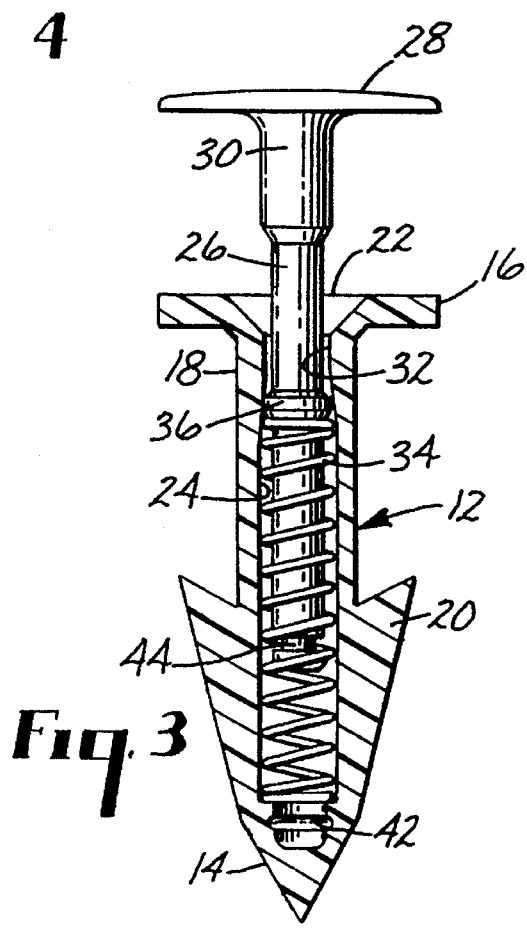
FIG. 3 is a central longitudinal sectional view of the indicator of FIG. 1 in an extended position.

Barrel 12 communicates through orifice 22 with cavity 24. Cavity 24 is adapted to contain at least part of plunger 26 that is disposed through orifice 22 of barrel 12 and is maintained in slidable relation thereto within cavity 24. Plunger 26 is adapted to travel between a retracted position and an extended position. FIGS. 1 and 2 illustrate plunger 26 in a retracted position, but the term "retracted position" is not limited to one in which cap 28 is in intimate contact with flange 16. Additionally, the indicator of the present invention, when constructed without the cap of the preferred embodiment, may be in a retracted position with upper plunger end 30 either within cavity 24 or partially protruding therefrom. FIG. 3 illustrates plunger 26 in an extended position. Plunger 26 provides a visual indication of the attainment of a predetermined temperature when plunger 26 is in an extended position.

Means are provided to resiliently bias plunger 26 toward the extended position. In the illustrated embodiment, the biasing means comprises a spring 34. In FIG. 2, spring 34 is circumferentially disposed about plunger 26 and exerts a force in direction 50 against annular plunger flange 36 located on plunger 26. The opposite end of spring 34 contacts and exerts a force against annular seat 38, formed in cavity 24.

Retaining means are provided to maintain plunger 26 in a retracted position prior to use against the force of spring 34. The retaining means includes a retaining material 40 positioned within cavity 24 to mechanically interfere with plunger 26. In the illustrated embodiment, retaining material 40 is positioned within annular retainer cavity 42, which is aligned with annular plunger depression 44. Both retainer cavity 42 and plunger depression 44 are illustrated as annular semi-hemispherical depressions, but any configuration which will permit mechanical interference between retaining material 40 and retainer cavity 42, and/or between retaining material 40 and plunger depression 44 is contemplated. Furthermore, retaining material 40, plunger depression 44 and retainer cavity 42 could be located at any point along plunger 26 so as to retain plunger 26, but are preferably located adjacent lower barrel end 14.

Plunger 26 is maintained in a retracted position by the retaining material 40 until, after exposure to an elevated temperature at or near the preselected temperature, retaining material 40 yields, allowing spring 34 to move plunger 26 in direction 50. The "melting temperature," as used herein, means the onset temperature or the temperature at which the retaining material begins to melt. The temperature at which all the material has melted is immaterial to the present invention, because yielding will occur before all the material has melted. "Yield" as used herein, means fuse, melt, plasticize, or become ductile, malleable, or deformable to the point where the retaining material is of insufficient shear strength to maintain the plunger in a retracted position against the pressure of spring 34. "Yield temperature", as used herein, means the temperature at which yielding occurs, and is typically near the melting temperature, although the exact yield temperature differs depending on the particular retaining material selected.

Yielding may occur by one of several mechanisms. Once the ambient temperature reaches the melting temperature of retaining material 40, part of the material may liquefy, and thereafter function as a lubricant. Alternatively, retaining material 40 may liquefy quickly and be of insufficient shear strength to maintain shaft 36 in the retracted position. Retaining material 40 may also soften until spring 34 causes part of the material to be sheared away by retainer cavity 42. Once the shear strength of retaining material 40 has diminished, spring 34 urges shaft 36 into an extended position, which provides a visual indication of the attainment of the specified temperature. Referring to FIG. 3, plunger 26 is shown in the extended position, which position corresponds to the ambient temperature being above the yield temperature of retaining material 40.

Figure 4:
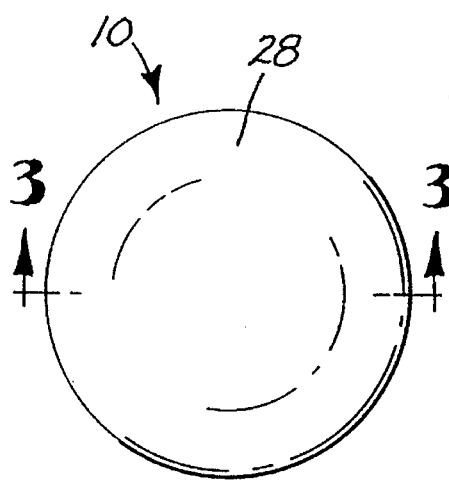
FIG. 4 is a top view of the indicator of FIG. 1.

Referring to FIGS. 1 and 4, the preferred embodiment of the present invention is shown. Cap 28 is affixed atop plunger 26 and is adapted to maintain intimate contact with flange 16. When plunger 26 is in a retracted position, cap 28 prevents contaminants from entering cavity 24, and prevents retaining material from leaking out of indicator 10. Cap 28 also provides increased visibility when plunger 26 is in the extended position. Upper plunger end 30 can be adapted to maintain sliding sealing contact with cavity wall 32 to further aid in preventing contaminants from entering, or retaining material from leaving cavity 24.

Figure 5:
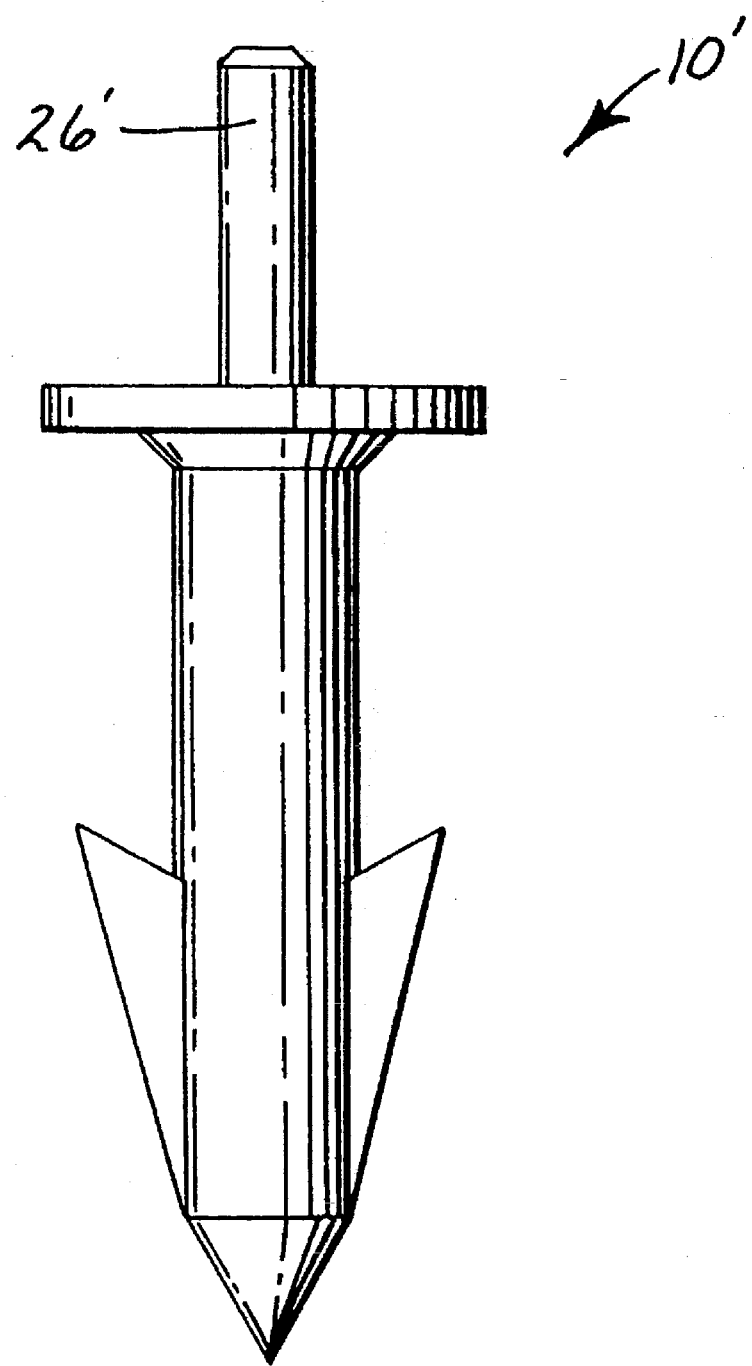
FIG. 5 is a side elevation view of an alternate embodiment of the indicator of the present invention.
Figure 6:
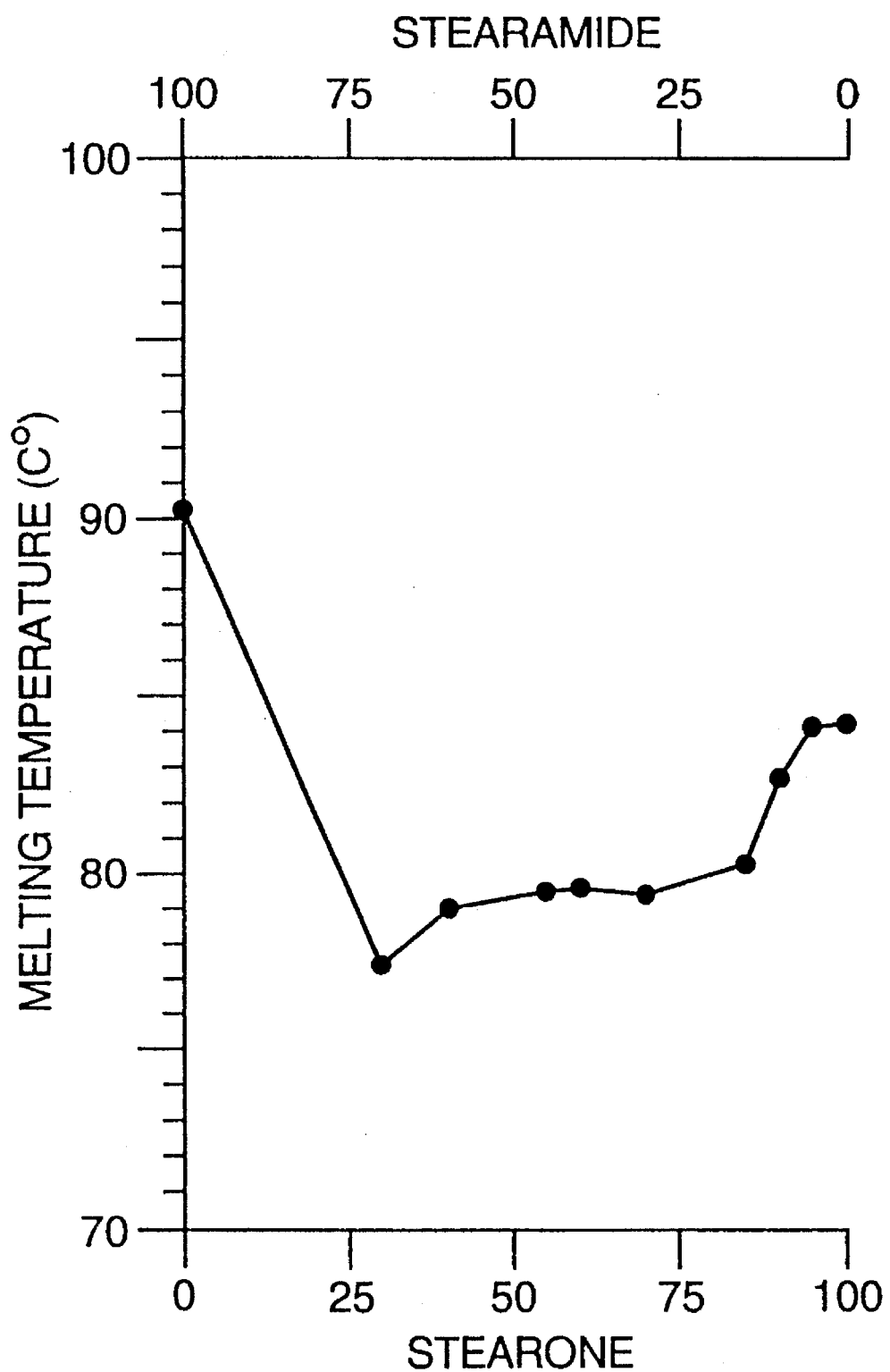
FIG. 6 is a graph showing the effect of relative concentration of each organic compound of the mixture on the melting point of the mixture.

Referring to FIG. 5, an alternate embodiment 10' of the present invention is shown. Cap 28 has been omitted, thereby presenting plunger 26' for visual identification upon the attainment of the specified temperature.

The present invention is primarily directed to improvements in retaining material 40. The composition suitable for preparing the retaining material of this invention comprises at least two organic compounds selected from the group consisting of (1) fatty acids, (2) fatty ketones, (3) fatty amides, and (4) fatty anilides, provided that at least one of said two organic compounds is selected from the group consisting of fatty ketones and fatty acids and at least one other of said two organic compounds is selected from the group consisting of fatty amides and fatty anilides. For the purposes of this invention, "fatty acids" include myristic acid, stearic acid, and lignoceric acid, "fatty ketones" include stearone (i.e., 18-pentatriacontanone), myristone (14-heptacosanone), and palmitone (16-hentriacontanone), "fatty amides" include stearyl stearamide, stearamide, and lauryl palmitamide, "fatty anilides" include myristanilide and stearanilide. Fatty acids suitable for this invention can be represented by the general formula:

$$CH_3(CH_2)_n COOH$$

wherein $n \geq 5$, preferably $12 \leq n \leq 28$
Fatty ketones suitable for this invention can be represented by the general formula:

$$C_pH_{2p+1}COC_mH_{2m+1}$$

wherein
  $p \leq 5$ and $m \leq 5$, preferably
  $8 \geq p \leq 30$ and $8 \leq m \leq 30$
Fatty amides suitable for this invention can be represented by the general formula:

$$C_qH_{2q+1}CONHR$$

wherein
  R represents H or $C_rH_{2r+1}$
and
  $q \geq 5$ and $r \geq 5$, preferably
  $15 \leq q \leq 30$ and $15 \leq r \leq 30$
Fatty anilides suitable for this invention can be represented by the general formula:

$$CH_3(CH_2)_2CONHC_6H_5$$

wherein
  $s \geq 5$, preferably $13 \leq s \leq 28$
The organic compounds can be straight-chain or cyclic. However, up to 20%, preferably no more than 5% of the organic compound can be branched. The compounds should have a sufficient number of carbon atoms in the straight chain or cyclic ring such that they will be solids at temperatures equal to or less than 55° C. The atoms in the straight chain or ring consist only of carbon atoms. However, the straight chain can be terminated by atoms that are not carbon atoms. If straight-chain compounds are used, the functional groups (e.g., —COOH, —OCH$_3$, —OH) are preferably located at the end of the straight chain. However, they can also be attached to carbon atoms in the straight chain.

It is preferred that any organic compound used to prepare the retaining material be at least 80% pure, more preferably at least 95% pure. It is also preferred that any organic compound used to prepare the retaining material have a single melting point, preferably between 56° C. and 95° C. The compound should be adapted to melt within a range of 150° C. of the melting point. As used herein, the expression "melting point" means the temperature at which onset of melting begins; the expression "melting range" means the temperature interval over which all the retaining material melts. Melting temperatures of the compounds disclosed herein were determined by using a differential scanning calorimeter (DSC) which was programmed to increase the ambient temperature at the rate of 10° C. per minute. The DSC used was the DuPont 912 Differential Scanning Calorimeter, manufactured by the E. I. DuPont de Nemours & Company, Inc., Wilmington, Del. 19898.

The following table shows mixtures that are suitable for preparing the retaining means of the present invention:

| Formulation | Ingredient | Melting point of ingredient (onset) (°C.) | Amount (% by weight) | Melting point of mixture (°C.) |
|---|---|---|---|---|
| I | stearone | 84.3 | 60–95 | 79–84 |
|  | stearyl stearamide | 90.2 | 40–5 |  |
| II | stearone | 84.3 | 70–95 | 84–85 |
|  | stearamide | 103 | 30–5 |  |
| III | stearone | 84.3 | 70–90 | 72–75 |
|  | lauryl palmitamide | 76.9 | 30–10 |  |
| IV | stearone | 84.3 | 10–40 | 73–74 |
|  | palmityl lauramide | 76.5 | 90–60 |  |
| V | stearone | 84.3 | 15–50 | 77–78 |
|  | myristanilide | 84.9 | 85–50 |  |
| VI | stearone | 84.3 | 50–90 | 81–82 |
|  | stearanilide | 94 | 50–10 |  |
| VII | stearone | 84.3 | 15–59 | 69–72 |
|  | stearyl stearamide | 90.2 | 23–48 |  |
|  | myristanilide | 84.9 | 17–50 |  |
| VIII | stearone | 84.3 | 47–80 | 78–83 |
|  | stearanilide | 94 | 18–50 |  |
|  | stearic acid | 67.2 | 0.1–6.0 |  |
| IX | myristanilide | 84.9 | 95.0–99.5 | 80–84 |
|  | myristic acid | 54 | 5.0–0.1 |  |

It is preferred that the carbon atoms in the straight-chain, in the ring, in the ester groups, and in the acid groups not have substituents other than hydrogen atoms. However, these carbon atoms can have substituents other than hydrogen atoms, provided that these substituents are chemically and physically inert upon being subjected to the heat which is applied during use of the indicator in a cooking environment.

The organic compounds required to produce the retaining material of the present invention can be ordered in the desired purity from the following companies:

Tokyo Kasei Kogyo Co., Ltd. Tokyo Chemical Industry Co., Ltd. 3-9-4 Nihonbashi-Honcho, Chuo-Ku Tokyo 103 Japan Pfaltz & Bauer, Inc. Division of Aceto Corportation 172 E. Aurora Street Waterbury, Conn. 06708

The indicator of the present invention is prepared and assembled in the following manner. The organic compounds are heated and melted in a glass or stainless steel container to a temperature not to exceed 250° C. The resultant molten material is poured through a screen into another heated vessel (also less than 250° C.) to strain out any foreign matter. In contrast to the nitrogen-containing material of U.S. Pat. No. 4,170,956, the retaining material of the present invention does not gel, and must be screened only to remove any foreign particles that have infiltrated the mixture. A metered amount of the material is pumped into barrel 12. In the preferred embodiment, spring 34 is guided into the barrel, and plunger 26 is then guided through the spring and into the barrel.

The entire barrel is heated to between 130° C. and 260° C. while the plunger is slowly depressed into a retracted position. The temperature to which the barrel must be heated to melt the material within depends on several factors, including the type of material used to construct the barrel, the wall thickness, and the type of retaining material used. Once the plunger has been pressed into a retracted position and the organic material melted, the plunger is held in place by means known in the art, and therefore not shown, while indicator 10 is cooled by a water source, thereby solidifying retaining material 40.

The retaining materials of the present invention are non-toxic, readily available from commercial resources, and less expensive than alloys and the nitrogen-containing materials of U.S. Pat. No. 4,170,956. In addition, the assembly process of the present invention is significantly faster and more efficient than that required for the nitrogen-containing materials of U.S. Pat. No. 4,170,956, because the retaining materials of the present invention do not gel, and therefore require straining only to remove foreign particulate matter.

The present invention has now been described with reference to several embodiments thereof. It will be apparent to those skilled in the art that many changes can be made from the embodiments described without departing from the scope of the present invention. For example, the present invention has been described with reference to heating food in a conventional oven, but the present invention could be used in a microwave oven with suitable modifications. Thus, the scope of the present invention should not be limited to the structures described in this application, but only by structures described by the language of the claims, and the equivalents of those structures.

What is claimed is:

1. A thermal indicator for providing an indication that an article of food is heated to a predetermined temperature, comprising:

a barrel having an orifice communicating with a cavity within said barrel, said barrel being adapted for insertion into the article of food to be heated;

a plunger disposed in said cavity and adapted for sliding travel therein between a retracted position and an extended position;

means for resiliently biasing said plunger away from said retracted position and toward said extended position; and means for releasably retaining said plunger in said retracted position, said means comprising an organic material which, when at a temperature below the predetermined temperature, maintains said plunger in said retracted position, and which, when at a temperature equal to or higher than the predetermined temperature, yields to permit release of said plunger, said retaining means comprising (1) a fatty Ketone and (2) at least one other organic compound selected from the group consisting of fatty amides and fatty anilides, said plunger released from said retracted position upon the attainment of the predetermined temperature, said biasing means urging said plunger into said extended position for visual indication.

2. The indicator of claim 1, wherein said fatty Ketone and said at least one other compound are at least 80% pure.

3. The indicator of claim 1, wherein the melting temperatures of said fatty Ketone and said at least one other organic compound are between 56° C. and 95° C.

4. The indicator of claim 1, wherein said fatty ketone is a straight-chain fatty ketone having at least 11 carbon atoms in the straight chain.

5. The indicator of claim 1, wherein said at least one other organic compound comprises a straight chain fatty anilide having at least 7 carbon atoms in the straight chain.

6. The indicator of claim 1, wherein said fatty ketone is a cyclic fatty ketone.

7. The indicator of claim 1, wherein said at least one other organic compound comprises a cyclic amide.

8. The indicator of claim 1, wherein said at least one other organic compound comprises a cyclic anilide.

9. The indicator of claim 1, wherein said retaining means has a melting point no greater than that of any single component.

10. The indicator of claim 1, wherein a cap is mounted on said plunger.

11. The indicator of claim 1, wherein each of said fatty Ketone and said at least one other organic compound is at least 95% pure.

12. The indicator of claim 1, wherein each of said fatty Ketone and said at least one other organic compound has a single melting point.

13. The indicator of claim 1, wherein the melting range of said retaining means is no greater than about 15° C.

* * * * *